Patented Nov. 5, 1946

2,410,406

UNITED STATES PATENT OFFICE 2,410,406

PROCESS FOR PRODUCING MEPACRINE DIHYDROCHLORIDE

William Arthur Cowdrey and Arthur George Murray, Blackley, Manchester, England, assignors to Imperial Chemical Industries Limited, a corporation of Great Britain No Drawing. Application June 21, 1944, Serial No. 541,462. In Great Britain June 16, 1943

8 Claims. (Cl. 260—279)

The substances known to medicine as mepacrine hydrochloride and mepacrine methanesulphonate are hydrated forms of the dihydrochloride and the dimethanesulphonate, respectively, of a substituted aminoacridine, namely 2-methoxy-6-chloro - 9 -(4' - diethylamino -1' - methyl - butylamino) -acridine, which for brevity will hereafter be referred to in this specification as "mepacrine base."

It is not known whether mepacrine base forms a monohydrochloride, at least in phenol solution. It may be that a mixture of mepacrine base with an equimolecular proportion of hydrogen chloride in phenol forms a mixture of free base and dihydrochloride. However, for convenience and brevity, the term "mepacrine monohydrochloride" will be used in this specification to describe whatever compound or mixture of compounds arises from the combination of mepacrine base with one molecular proportion of hydrogen chloride.

It is known, see, for example, British specification No. 363,392, that mepacrine monohydrochloride can be made by heating 2-amino-5-diethylamino-pentane with 2-methoxy-6:9-dichloroacridine in presence of phenol.

Further, it is known (see specification No. 363,392, Example 9) that 2-methoxy-6:9-dichloroacridine when heated with phenol is converted into 2-methoxy-6-chloro-9-phenoxyacridine hydrochloride.

Moreover, we have found that when 2-methoxy-6:9-dichloroacridine is heated with 2-amino-5-diethylaminopentane in the absence of phenol, no mepacrine derivative is produced.

From these observations it is reasonable to infer that the compounds which actually combine together in the process of specification No. 363,392 are 2-amino-5-diethylaminopentane, 2-methoxy-6-chloro-9-phenoxyacridine and one molecular proportion of hydrogen chloride. Since we have also found that mepacrine monohydrochloride can be similarly obtained if the reaction is carried out with other phenols instead of phenol itself, for example, cresols or cresylic acid, it can be said that the actual reagents in this process are the 2-amino-5-diethylaminopentane, a 2-methoxy-6-chloro-9-aryloxyacridine and one molecular proportion of hydrogen chloride.

In seeking to improve the yield obtained in this process, we have found that the reaction between 2-amino-5-diethylaminopentane and a 2-methoxy-6-chloro - 9 - aryloxyacridine hydrochloride (whether the latter is introduced as such or generated in situ from the dichloroacridine and an appropriate phenol) is reversible and that when equimolecular proportions of the reagents are used the yield of mepacrine monohydrochloride isolated from the equilibrium mixture is 80%, using ordinary technical quality starting materials, or 87% using highly purified starting materials. According to the law of mass action one could, of course, expect to increase the amount of mepacrine monohydrochloride present at equilibrium by using an excess of one of the reagents, and if one or other of these were cheap, such a process might be technically attractive. In the present case, however, the two reagents must both be made by a complicated synthesis and consequently both are expensive. Moreover, although by the use of an excess of one of them, the yield, calculated on the usage of one component would increase, calculated on the usage of the other component it would diminish. Also recovery of any such excess of the reagent is technically and economically unattractive, so that it is highly desirable, when operating the process upon the large scale, to use substantially equimolecular proportions of the two components. It would, of course, be theoretically possible to displace the equilibrium in the desired direction by diminishing the amount of phenol, which in practice is used in large excess so that it functions also as a solvent. However experience indicates that to produce any appreciable change in yield in this way requires that the amount of phenol be so far cut down that the reaction system is not fluid enough to make adequate stirring possible. Consequently it can be said that for all practical purposes the optimum yield obtainable by this process is 80% with ordinary technical starting materials or 87% with specially purified starting materials.

Following this by an examination of the reaction between the bases themselves, in the absence of hydrogen chloride, we have found that the interaction of 2-amino-5-diethylaminopentane with 2-methoxy-6-chloro-9-phenoxyacridine to form mepacrine base also leads to an equilibrium, the yield in this case being about 70% of the theoretical with technical quality starting materials.

In each case the end-product, mepacrine monohydrochloride or mepacrine base, when itself heated with phenol at 100° C. reacts to some extent with the phenol, forming 2-methoxy-6-chloro-9-phenoxy-acridine and 2-amino-5-diethylamino-pentane.

Mepacrine dihydrochloride, on the other hand, when similarly heated with phenol, does not break down appreciably, from which one may conclude that either the reaction which leads to its formation is not reversible, or else the equilibrium position is at nearly 100% reaction.

This conclusion has been borne out in practice. Thus by heating together in phenol at 100° C. approximately equimolecular proportions of 2-amino-5-diethylaminopentane and 2-methoxy-6-chloro-9-phenoxyacridine, in presence of two equivalents of hydrogen chloride we have obtained mepacrine dihydrochloride in 90–94% yield. Further, we have found that if the proportion of hydrogen chloride present in the system be progressively further increased the yield steadily falls, so that on heating together in phenol 2-amino-5-diethylaminopentane dihydrochloride and 2-methoxy-6-chloro-9-phenoxy-acridine hydrochloride (i. e. 3 equivalents of hydrochloric acid present), there is virtually no reaction.

Accordingly it will be seen that by carrying out the reaction under such conditions that there is at all times present sufficient, but only sufficient, hydrogen chloride to convert the mepacrine base formed into its dihydrochloride, there is obtained an increased yield amounting to 7–10% above that attained by the hitherto known processes. Such an increase, in the case of a medicinal product made by a highly complicated synthesis, is of considerable importance.

It will be appreciated, of course, that by using proportions of hydrogen chloride amounting to between 1 and 2 equivalents per mole of the acridine or pentane derivative the yield obtained will be higher than with the hitherto known processes, although the optimum results are not obtained until 2 equivalents are used. This is to be expected since such operations can be regarded as carrying out simultaneously the hitherto customary process and the process of the present invention. We have found in fact that increased yields are obtained when the proportion of hydrogen chloride present lies in the range 1.25 to 2.25 equivalents per mole of the aminopentane or acridine component.

Moreover, with this "dihydrochloride" process also, as with the hitherto known "monohydrochloride" process, we have found that the reaction can be carried out with other phenols, e. g. cresols or cresylic acid, instead of phenol itself and as compared with the case where these same phenols are used in the "monohydrochloride" process, increased yields are obtained.

The present invention therefore provides an improved process for the manufacture of mepacrine hydrochlorides (dihydrochloride or mixtures of mono- and di-hydrochlorides) which comprises heating together, in a phenol as solvent, approximately equimolecular proportions of 2-amino-5-diethylaminopentane and a 2-methoxy-6-chloro-9-aryloxyacridine in the presence of a quantity of hydrogen chloride amounting to between 1.25 and 2.25 equivalents per mole of the aminopentane or of the acridine.

The invention may be put into practice in a number of ways. Thus, for example, one may bring about reaction between 2-methoxy-6-chloro-9-phenoxy-acridine and 2-amino-5-diethylaminopentane dihydrochloride, or between 2-methoxy-6-chloro-9-phenoxy-acridine hydrochloride and 2-amino-5-diethylamino-pentane monohydrochloride or one can start from 2-methoxy-6:9-dichloroacridine, 2-amino-5-diethylaminopentane monohydrochloride and phenol, thus in fact generating 2-methoxy-6-chloro-9-phenoxyacridine hydrochloride in situ and adding the 2-amino-5-diethylaminopentane monohydrochloride either initially or only after completion of the first stage of the reaction.

A very convenient manner of practising the invention is to dissolve half a molecular proportion of 2-amino-5-diethylaminopentane in phenol and then add 1 molecular proportion of hydrogen chloride, thus forming the dihydrochloride, and then either to add 1 molecular proportion of 2-methoxy-6-chloro-9-phenoxyacridine hydrochloride or to add 1 molecular proportion of 2-methoxy-6:9-dichloroacridine and heat so as to convert this (with the aid of the phenol) into the hydrochloride of the phenoxy compound. Under these conditions there is at this stage virtually no interaction between the acridine and the aminopentane compounds because there is present an excess of hydrogen chloride. Finally the other half molecular proportion of the pentane base is added, whereupon the proportion of hydrogen chloride having been thus brought down to 2 equivalents per mole of aminopentane, the formation of mepacrine dihydrochloride takes place.

In carrying the invention into practice in the manner last described, the hydrogen chloride can be supplied either in the gaseous form or as aqueous hydrochloric acid. In the latter case the water must all be removed, for example by adding a solvent such as toluene or xylene followed by azeotropic distillation, before the acridine derivative is added. If this is not done the yield drops owing to formation of 6-chloro-2-methoxyacridone which will not react satisfactorily with the aminopentane.

When aqueous hydrochloric acid is used and the water is removed by azeotropic distillation it is not necessary thereafter to remove all the solvent. A small proportion can, if desired, be left without detriment to serve, with the phenol, as solvent for the subsequent reactions.

Finally, we have found that increased yields of the mepacrine derivative are also obtained if instead of the hydrogen chloride there are used other strong mineral acids such as hydrogen bromide or sulphuric acid, provided that the essential condition of this invention is still observed, namely, that for each molecular proportion of the acridine (or aminopentane) component there is used 1.25 to 2.25 equivalents of acid. Where the hydrogen chloride is so replaced, either wholly (as in Example 5) or in part (as in Example 4), the immediate product will not, of course, be, or will not wholly be, mepacrine dihydrochloride. It can, however, be readily converted thereto by known methods or by the method described in copending application Ser. No. 540,753.

In carrying into practice this last-mentioned embodiment of the invention one may, for instance, start by dissolving half a molecular proportion of 2-amino-5-diethylaminopentane and phenol and adding half a molecular proportion of sulphuric acid (i. e. two equivalents of acid with respect to the pentane base). Then xylene is added and the water is removed by azeotropic distillation, the quantity of xylene remaining eventually being preferably not more than about 33% of the phenol. One molecular proportion of 2-methoxy-6:9-dichloroacridine is then added and the mixture is heated to convert this (with the aid of the phenol) to the phenoxy compound. Finally the remaining half molecular proportion of 2-amino-5-diethylamino-pentane is added and the reaction mixture is heated again to bring about the formation of the mepacrine derivative.

The following examples illustrate, but do not limit, the invention. The parts are by weight.

*Example 1*

15.8 parts of 2-amino-5-diethylaminopentane are dissolved in 160 parts of phenol at 50–60° C. and dry hydrogen chloride is passed in, in quantity just sufficient to form the dihydrochloride of the amine, as shown by a faint permanent acid reaction to Congo red.

55.6 parts of 2-methoxy-6:9-dichloroacridine are then added, and the mixture is heated at 90–100° C. for 1 hour to bring about the conversion to 2-methoxy-6-chloro-9-phenoxyacridine hydrochloride.

A further 15.8 parts of 2-amino-5-diethylaminopentane are then added at a temperature of 95–100° C. After further stirring for 2 hours at 90–110° C. the reaction mass is added to a mixture of 550 parts of benzene and 600 parts of 15% caustic soda solution, whereby the phenol is dissolved by the caustic soda solution, and the mepacrine base is dissolved by the benzene.

The benzene solution is separated off and repeatedly washed with water; it is then extracted with 320 parts of 20% aqueous acetic acid solution (three extractions with respectively 200, 60 and 60 parts) whereby the base is extracted into the aqueous layer in the form of its acetate.

The acetate solution is separated from the benzene layer (which now contains only traces of 2-methoxy - 6 - chloro - 9 - phenoxyacridine, and other impurities) and aqueous hydrochloric acid is added, preferably in the manner described in copending application Ser. No. 540,753, whereby the hydrated form of the dihydrochloride of mepacrine base is precipitated. This is filtered off, washed with acetone and dried, when 92 parts (i. e. a 90% yield) of excellent quality mepacrine hydrochloride (i. e. the hydrated dihydrochloride) are obtained. Further small quantities can be obtained by working up the mother liquors.

*Example 2*

15.8 parts of 2-amino-5-diethylaminopentane are dissolved in 120 parts of phenol, and sufficient aqueous hydrochloric acid is added to give a faint acidity to Congo red. The amine has now been converted to its dihydrochloride.

60 parts of xylene are then added and the mixture is boiled in an apparatus provided with a refluxing device such that the distillate, which condenses into a two-phase liquid, is separated and the layer consisting essentially of xylene is returned to the reaction vessel whilst the aqueous layer is discarded. Boiling is continued until substantially all the water is removed and the boiling point of the liquid reaches 150° C. Under these conditions approximately 40 parts of the xylene remains in the reaction mixture.

The mixture is cooled and 55.6 parts of 2-methoxy-6:9-dichloroacridine are added at about 90° C. and the mixture is maintained at 90–100° C. for 1 hour.

17.4 parts of 2-amino-5-diethylaminopentane (making the total correspond to about 5% excess of the amine over the theoretical amount) are then added at 95–100° C. and the temperature is maintained at 100–110° C. for a further 2 hours.

The reaction is then complete, and the isolation of the mepacrine hydrochloride can be carried out in the manner described in Example 1. The yield is 94 parts, i. e., 92% of theory.

Alternatively the base can be isolated by extraction from the benzene solution by aqueous acetic acid, as already described, then making the solution alkaline and extracting the free base so liberated into ether in the manner described in British specification No. 363,392. On drying and evaporating off the ether the anhydrous mepacrine base remains as an oil. If this is dissolved in acetone and water is added, a crystalline precipitate is formed. This consists of mepacrine base monohydrate $C_{23}H_{30}N_3OCl \cdot H_2O$ and has M. P. 88° C. It can be converted to the dihydrochloride by treatment, in ether solution, with an ether solution of hydrogen chloride.

In this example, the phenol can be replaced by an equal weight of cresylic acid, and similarly the xylene used for the azeotropic drying can be replaced by other inert water-immiscible solvents e. g. chlorobenzene or toluene.

*Example 3*

31.6 parts of 2-amino-5-diethylamino-pentane are dissolved in 160 parts of phenol and dry hydrogen chloride is passed in, in quantity just sufficient to form the dihydrochloride of the amine, as shown by a faint permanent acid reaction of Congo red.

67.1 parts of 2-methoxy-6-chloro-9-phenoxyacridine base (M. P. 153–4° C.) are then added at 100–110° C., and after a further 2 hours heating at 100–110° C., the mepacrine is isolated by either of the methods given in Examples 1 and 2. The yield of mepacrine hydrochloride (i. e. hydrated dihydrochloride) is 92 parts, i. e. 90% of theory.

*Example 4*

15.8 parts of 2-amino-5-diethylaminopentane are dissolved in 120 parts of phenol, and sufficient aqueous hydrobromic acid is added to give a faint acidity to Congo red paper.

60 parts of xylene are then added and the water is distilled out of the mixture as described in Example 2. When all the water has been removed, as much as possible of the xylene is distilled off leaving a mixture of phenol and the dihydrobromide of 2-amino-5-diethylaminopentane containing only a little xylene.

After cooling to about 90° C., 55.6 parts of 2-methoxy-6:9-dichloroacridine and 17.4 parts of 2-amino-5-diethylaminopentane are added in the manner described in Example 2.

When the reaction is complete mepacrine hydrochloride is isolated by either of the methods given in Examples 1 and 3. The yield is approximately 93 parts, i. e. 91% of theory.

*Example 5*

38.4 parts of 2-amino-5-diethylaminopentane are added to a mixture of 120 parts of phenol and 60 parts of xylene and dilute sulphuric acid is added until the mixture is faintly acid to Congo red paper. This acidity is then neutralised by addition of a further small quantity of 2-amino-5-diethylaminopentane.

Water and most of the xylene are then distilled out as described in Examples 2 and 3 and the mixture is cooled to about 90° C. 67.1 parts of 2-methoxy-6-chloro-9-phenoxyacridine are added at about 90° C. and the mixture is heated at 100–110° C. for 2 hours. Mepacrine hydrochloride is then isolated by either of the methods given in Examples 1 and 2. The yield is approximately 93 parts, i. e. 91% of theory.

Whereas the above examples illustrate several embodiments of our invention, it will be apparent to one skilled in the art that many other variations or modifications can be devised without departing from the spirit and scope thereof and accordingly it is to be understood that the invention is not in any way limited thereby, but only as defined in the following claims.

We claim:

1. In the process of preparing a double salt of mepacrine by reacting together 5-diethylamino-2-amino-pentane, 2-methoxy-6-chloro-9-aryloxyacridine and a mineral acid, the improvement which consists in adding initially to the reactants sufficient mineral acid to establish in the aforesaid reaction mass a concentration of said acid equal to between 1.25 and 2.25 equivalents of mineral acid per mole of mepacrine salt to be produced.

2. A process as in claim 1 wherein the mineral acid is employed in the form of an aqueous solution thereof, and wherein the water is removed from the reaction mass by azeotropic distillation with an inert organic liquid.

3. In the manufacture of the dihydrochloride of 2-methoxy-6-chloro-9-(4'-diethylamino-1'-methyl-butylamino)-acridine, the step which comprises heating together, in a phenol as solvent, approximately equimolecular proportions of 2-amino-5-diethylaminopentane and a 2-methoxy-6-chloro-9-aryloxyacridine in the presence of a quantity of hydrogen chloride amounting to between 1.25 and 2.25 equivalents per mole of the aminopentane.

4. Process as claimed in claim 1 wherein the 2-methoxy-6-chloro-9-aryloxyacridine is generated in situ from 2-methoxy-6:9-dichloroacridine and the appropriate phenol.

5. In the process of preparing mepacrine dihydrochloride by reacting together a reaction mass containing 5-diethylamino-2-amino-pentane, 2-methoxy-6-chloro-9-phenoxy-acridine, and hydrogen chloride in chemical combination with at least one of the aforegoing two reactants, the improvement which consists in selecting the components of the reaction mass so as to set up in the reaction mass equivalent quantities of the phenoxy-acridine and the diamino-pentane, and at least 1.25 but not more than 2.25 equivalent quantities of total HCl, including in said count free HCl and HCl combined with any of the reactants.

6. In the process of preparing mepacrine dihydrochloride by reacting together a reaction mass containing on the one hand a member selected from the group consisting of 5-diethylamino-2-amino-pentane monohydrochloride and its dihydrochloride and on the other hand a member selected from the group consisting of 2-methoxy-6-chloro-9-phenoxy-acridine and its monohydrochloride, the improvement which consists in selecting the components of the reaction mass so as to set up in the reaction mass equivalent quantities of the phenoxy-acridine and the diaminopentane, and substantially two equivalents of hydrogen chloride, including in said count free HCl and HCl combined with any of the reactants.

7. A process of forming mepacrine dihydrochloride, which comprises dissolving half a molecular proportion of 2-amino-5-diethylaminopentane in an excess of phenol, adding a quantity of hydrochloric acid sufficient to form the dihydrochloride of said 2-amino-5-diethylaminopentane, adding further 1 molecular proportion of a reagent of the group consisting of 2-methoxy-6-chloro-9-phenoxy-acridine hydrochloride and 2-methoxy-6,9-dichloro-acridine, and eventually adding another half-molecular proportion of 2-amino-5-diethylaminopentane, and heating the mixture to bring about formation of mepacrine dihydrochloride.

8. A process as in claim 7 wherein the hydrochloric acid is added in the form of an aqueous solution, and wherein an inert organic liquid from the group consisting of benzene, chlorobenzene, toluene and xylene is added to the mixture following the addition of the acid, and the mass is subjected to azeotropic distillation to remove the water, prior to addition of the acridine compound.

WILLIAM ARTHUR COWDREY.
ARTHUR GEORGE MURRAY.